United States Patent [19]

Ramsay et al.

[11] Patent Number: 5,915,971
[45] Date of Patent: Jun. 29, 1999

[54] TUTORIAL DEVICE AND METHOD FOR DETERMINING DRUG DOSAGES

[75] Inventors: Ogden Bertrand Ramsay; Alan Heezen, both of Ypsilanti, Mich.

[73] Assignee: Chemical Concepts Corporation, Ann Arbor, Mich.

[21] Appl. No.: 08/681,923

[22] Filed: Jul. 29, 1996

[51] Int. Cl.⁶ .......................... G09B 23/00; G09B 23/24; G09B 23/06; G09B 23/28
[52] U.S. Cl. .......................... 434/276; 434/262; 434/298; 434/300
[58] Field of Search ..................... 434/188, 262, 434/276, 298, 307 R, 322, 323, 327, 335, 362, 127, 189, 201, 202, 300, 332, 341, 344; 364/710.03, 400, 709.01, 709.02, 709.03, 709.06, 709.08, 710.01, 710.02, 710.09, 710.07, 710.11, 735, 710.12, 715.05

[56] References Cited

U.S. PATENT DOCUMENTS

| | | | |
|---|---|---|---|
| 4,689,753 | 8/1987 | Cameron | 364/496 |
| 4,807,170 | 2/1989 | Kulli et al. | 364/715.011 |
| 4,894,793 | 1/1990 | Ikemoto | 364/709.03 |
| 5,101,368 | 3/1992 | Kaplan | 364/715.05 |
| 5,732,001 | 3/1998 | Nakayama et al. | 364/710.03 |

*Primary Examiner*—Kien T. Nguyen
*Assistant Examiner*—John Edmund Rovnak

[57] ABSTRACT

A tutorial device and method for teaching and learning how to determine a calculated drug dosage and/or unit conversions. The device includes a data entry device for entering data; a device for determining a calculated drug dosage in response to the entered data; and a display device for displaying the calculated drug dosage or unit conversion and for displaying the technique used for calculating the appropriate dosage. The data entry device allows the user to enter a proposed solution. The device would then indicate if the proposed solution is appropriate for determining the calculated drug dosage or unit conversion and supply a hint if the proposed solution is incorrect. The hint being something other than displaying the correct solution or next step.

22 Claims, 25 Drawing Sheets

MS-DOS PROMPT    TUTORIAL MODE

FILE  RX  OPTIONS

=== RX ENTRY ===

CLIENT  [HANCOCK]  LAST   [HERBIE]  FIRST   [   ]  MID   [PICK]

WGT [38 lb]   HGT [42"]   AGE [4 YR]   [BSA]
 44

PRESCRIBER  [   ]  LAST   [   ]  FIRST   [   ]  MID   [PICK]

MEDICA...   === PICK A DRUG ===                    DESIRED DOSE
    N       [□]  ASPRIN      5 gr / TAB
                 ASPRIN      5 gr / TAB
    RE           CARDIZEM    30 mg / TAB
    MINI         CARDIZEM    60 mg / TAB
    MAX          DARVOCET    50 mg PER TAB
                 DARVOCET    50 mg / TAB
                 GORP        50 mg PER TAB
[PICK]           GORPOPEUM   50 mg PER TAB          ⌐ 55
                 MEVACOR     20 mg / TAB
                 NAPROSYN    250 mg / TAB

F1 HELP    ALT-X EXIT

FIG. 7

MS-DOS PROMPT　　　　　TUTORIAL MODE

FILE　RX　OPTIONS

RX ENTRY

CLIENT　　LAST [HANCOCK]　FIRST [HERBIE]　MID [ ]　PICK

WGT [38 lb]　HGT [42"]　AGE [4 YR]　BSA [ ]
 44

PRESCRIBER　LAST [ ]　FIRST [ ]　MID [ ]　PICK

MEDICATION
NAME [CARDIZEM]　PICK

STRENGTH [60 mg / TAB]　DOSAGE [3.5 mg / kg]　DESIRED DOSE

RECOMMD  [180 mg / DAY]　PREQ [Q.I.D.]
MINIMUM  [30 mg QID]
MAXIMUM  [360 mg / DAY]　ROUTE [P.O.]
        66

[OK]　[CANCEL]

F1 HELP　ALT-X EXIT

```
┌─────────────────────────────────────────────────────────────┐
│ ≡  FILE  RX  OPTIONS          MS-DOS PROMPT    TUTORIAL MODE │
│ ┌─[□]──────────────────────── HANCOCK ────────────────── 1=[↑│
│                                                              │
│         CLIENT : HERBIE HANCOCK                              │
│      PRESCIBER :                                    ⎫        │
│           AGE : 4 YR                                ⎬ 33     │
│        HEIGHT : 42"                                 ⎭        │
│        WEIGHT : 38 lb                                        │
│                                                              │
│    DESIRED DOSE : 3.5 mg / kg                                │
│ DOSAGE STRENGTH : 60 mg / TAB                                │
│ WEIGHT OF CHILD : 38 lb                                      │
│ADMINISTERED DOSE: 1 TAB BY MOUTH FOUR (4) TIMES A DAY ⟵ L8   │
│──────────────────────────────────────────────────────────    │
│                                                     ⎫        │
│        1 kg        3.5 mg      1 TAB                ⎬ 35     │
│ 38 lb * ─────  *  ──────  *  ──────  =  1.005 TAB   ⎭        │
│         2.205 lb    1 kg      60 mg                          │
│──────────────────────────────────────────────────────────    │
│                                                     ⎫        │
│ TOTAL DAILY DOSE : 240 mg / DAY                     ⎬ 37     │
│   MAXIMUM DOSE  : 360 mg / DAY ⟵ L10               ⎭        │
│   MINIMUM DOSE  :  30 mg QID                                 │
│ RECOMMENDED DOSE: 180 mg / DAY                               │
│                                                              │
│ F1 HELP    ALT-X EXIT                                        │
└─────────────────────────────────────────────────────────────┘
```

*FIG. 8*

FILE  RX  OPTIONS                MS-DOS PROMPT                TUTORIAL MODE

CLIENT: HERBIE HANCOCK
PRESCIBER: HANCOCK
AGE: 4 YR
HEIGHT: 42"
WEIGHT: 38 lb

DESIRED DOSE: 3.5 mg / kg
DOSAGE STRENGTH: 60 mg / TAB
WEIGHT OF CHILD: 38 lb
ADMINISTERED DOSE: 1 TAB BY MOUTH FOUR (4) TIMES A DAY $$38\ lb\ *\ \frac{1\ kg}{2.205\ lb}\ *\ \frac{3.5\ mg}{1\ kg}\ *\ \frac{1\ TAB}{60\ mg}\ =\ 1.005\ TAB$$

TOTAL DAILY DOSE: 720 mg / DAY
MAXIMUM DOSE: 360 mg / DAY
MINIMUM DOSE: 30 mg QID
RECOMMENDED DOSE: 180 mg / DAY

F1 HELP    ALT-X EXIT

```
MS-DOS PROMPT                                    TUTORIAL MODE
FILE  RX  OPTIONS

CLIENT:  HERBIE HANCOCK
     PRESCIBER:
           AGE:  4 YR
        HEIGHT:  42"
        WEIGHT:  38 lb

DESIRED DOSE:  3.5 mg / kg
DOSAGE STRENGTH: 60 mg / TAB

DIMENSIONAL ANALYSIS TUTORIAL 1 kg  = 2.205 lb
  1 TAB = 60 mg

[38 lb]  *  [  ][  ]  *  [  ][  ]  *  [  ][  ]  =  [  ][UNITS]
       68⤴
             [HINT]  [INVERT]  [INVERT]  [INVERT]  [INVERT]
                     [SHOW ME]   [OK]     [CANCEL]   [CALC]

F1 HELP    ALT-X EXIT
```

(Screen layout, rotated 90°:)

MS-DOS PROMPT

FILE  RX  OPTIONS

HANCOCK                    TUTORIAL MODE

CLIENT:         HERBIE HANCOCK
PRESCIBER:
AGE:            4YR
HEIGHT:         42"
WEIGHT:         38 lb

DESIRED DOSE:       3.5 mg / kg
DOSAGE STRENGTH:    60 mg / TAB

DIMENSIONAL ANALYSIS TUTORIAL 1 kg  =  2.205 lb
1 TAB =  60 mg

[38 lb] * [1 kg / 2.205 lb] * [ ] * [ ] [UNITS] 70

= [17.23 kg] kg

[HINT]  [SHOW ME] 74  [INVERT]  [INVERT]  [INVERT]
                      [OK]      [CANCEL]  [CALC]

F1 HELP    ALT-X EXIT

FILE  RX  OPTIONS          MS-DOS PROMPT              TUTORIAL MODE

HANCOCK

CLIENT:      HERBIE HANCOCK
PRESCIBER:
AGE:         4YR
HEIGHT:      42"
WEIGHT:      38 lb

DESIRED DOSE:      3.5 mg / kg
DOSAGE STRENGTH:   60 mg / TAB

===== DIMENSIONAL ANALYSIS TUTORIAL =====

1 kg  = 2.205 lb
1 TAB =  60 mg

| 38 lb | * | 1 kg / 2.205 lb | * | 3.5 mg / 1 kg | * | 1 TAB / 60 mg |   UNITS   TAB

=  [ ]

| HINT | | INVERT | | INVERT | | INVERT |

| SHOW ME |   | OK |   | CANCEL |   | CALC |

F1 HELP   ALT-X EXIT

FILE RX OPTIONS MS-DOS PROMPT TUTORIAL MODE

HANCOCK

CLIENT: HERBIE HANCOCK
PRESCIBER:
AGE: 4YR
HEIGHT: 42"
WEIGHT: 38 lb

DESIRED DOSE: 3.5 mg / kg
DOSAGE STRENGTH: 60 mg / TAB

RATIO SETUP

DOSAGE = 3.5 mg / kg
WEIGHT = 17.2 kg

| 1 kg | = | 17.2 kg |
| 3.5 mg | | X |

SHOW ME   OK   CANCEL

HINT                    CALC

YOUR ANSWER:

89

F1 HELP    ALT-X EXIT

FILE  RX  OPTIONS                    MS-DOS PROMPT

HANCOCK                                              TUTORIAL MODE

CLIENT:      HERBIE HANCOCK
PRESCIBER:
AGE:         4YR
HEIGHT:      42"
WEIGHT:      38 lb

DESIRED DOSE:  3.5 mg = 60.34 mg
DOSAGE S

FORMULA MODE $\dfrac{D}{H} * Q =$   [60.34 mg]   $*$   [60 mg]   $=$   [1 TAB]   $=$   [X]

DOSAGE = 60.34 mg
STRENGTH = 60 mg / TAB

[HINT]  [SHOW ME]        [OK]        [CANCEL]

YOUR ANSWER:                                       [CALC]

F1 HELP   ALT-X EXIT

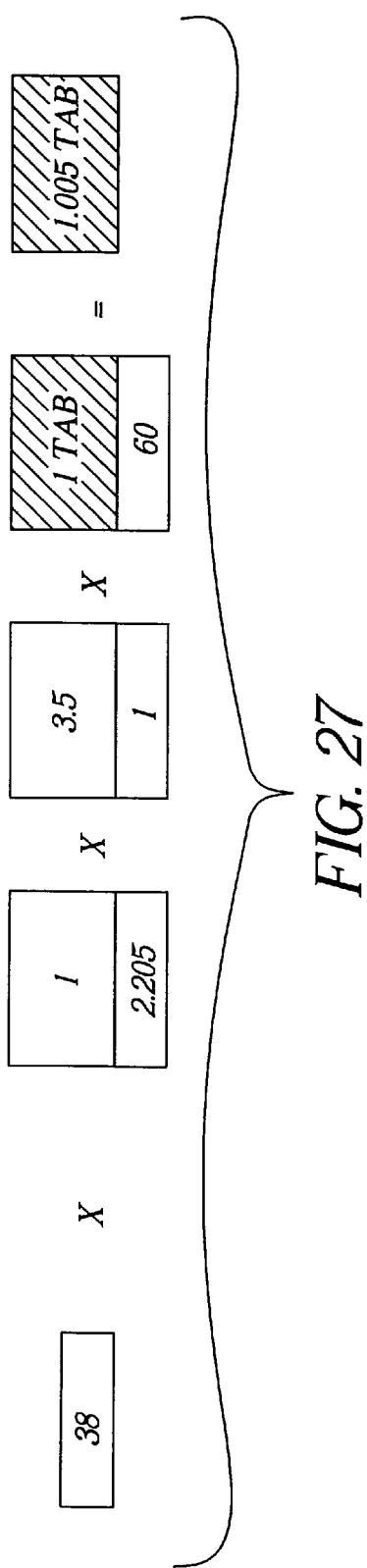

TUTORIAL DEVICE AND METHOD FOR DETERMINING DRUG DOSAGES

FIELD OF THE INVENTION

The present invention relates to a device for calculating drug dosages and for instructing a user on how to calculate appropriate drug dosages for patients.

BACKGROUND OF THE INVENTION

It is well recognized that proper drug dosage calculation and administration to a patient is very important. To assist individuals there currently exist drug dosage calculators that provide the correct dosage based on inputted information to the device. The reliability of the calculated dosage using this type of device, however, relies heavily on the user entering in the correct information the first time. Typically, once the information is entered, the dosage is determined and displayed. Since only the resultant dosage is displayed, there is no easy or convenient way of checking either the result or the set-up used to calculate the dosage, without re-entering and re-calculating the drug dosage. The typical advise given for those who use a standard calculator is to: "Double Check" the calculation and/or "Check" to see if it is "reasonable". This type of "checking" is extremely time consuming—and can lead to a variety of types of errors, including systematic errors (involving the input of the same incorrect or misread dosage strength each time) that would not be detected on double checking.

The determination of the proper dosage for a particular patient generally requires a series of calculations which involve various conversions of units. (For example, a pediatric prescription might call for the administration of "5 micrograms of a drug per every kilogram of the child's weight"—when abbreviated: 5 mcg/kg.) If the child's weight was recorded in pounds, then that weight must be converted to kilograms by dividing by 2.205 (since 1 kg=2.205 lb).

Though this type of conversion might seem rather straight forward, the consequence of an arithmetic error in calculating the dosage (for example, by multiplying instead of dividing by 2.205) could have a serious, if not fatal, consequence. In the training of nurses (or less typically, pharmacists and physicians), to do these calculations, a variety of methods are employed to arrive at the correct dosage. Since each method may involve a different strategy, the learning of how to do these drug dosage calculations is often quite difficult, especially for the beginning student. The lack of confidence generated by these difficulties can be carried over into the clinical setting which could lead to medication errors.

Thus, there exist a need for providing both a method and a device for calculating drug dosages wherein the drug dosage calculation results can be easily and quickly checked both for the correct entry information, and in the calculation set-up.

The present invention solves many of the problems discussed above by providing a device which displays not only the correctly calculated drug dosage, but also illustrates the set-up used to determine the drug dosage. In addition, the device can check the administered dosage against the safe dosage ranges. The device also provides a tutorial mode wherein various different techniques can be used for calculating drug dosage.

SUMMARY OF THE INVENTION

In one aspect of the present invention there is provided a device for determining an appropriate drug dosage comprising:

a) data entry means for entering data;

b) means for determining a calculated drug dosage in response to the entered data; and c) display means for displaying the calculated drug dosage and for displaying the technique used for calculating the appropriate dosage.

In accordance with another aspect of the present invention there is provided a method for determining an appropriate drug dosage, comprising the steps of:

a) providing a device for determining a calculated drug dosage;

b) entering data into device upon which the drug dosage can be calculated;

c) determining a calculated drug dosage in response to the entered data; and d) displaying the calculated drug dosage and the technique used for calculating the appropriate dosage.

In accordance with another aspect of the present invention there is provided a tutorial device for teaching how to determine a calculated drug dosage, comprising:

data entry means for entering data upon which the calculated drug dosage can be calculated;

means for determining a calculated drug dosage;

means for entering a proposed solution by at least one method; and means for indicating if the proposed solution is appropriate for determining the calculated drug dosage.

In accordance with another aspect of the present invention there is provided a tutorial device for teaching how to convert one unit of measure to another unit of measure, comprising;

data entry means for entering a known unit of measure;

means for converting the known unit of measure to a second known unit of measure;

means for entering a proposed solution for converting the first known unit of measure to the second unit of measure by at least one method; and means for indicating if the proposed solution is appropriate for converting the first known unit.

In yet another aspect of the present invention there is provided a method for teaching how to convert one unit of measure to another unit of measure, comprising;

a) providing a device for determining unit conversion;

b) entering a known unit of measure;

c) converting the known unit of measure to a second known unit of measure;

d) entering a proposed solution for converting the first known unit of measure to the second unit of measure by at least one method; and e) indicating if the proposed solution is appropriate for converting the first known unit entering data into device upon which the drug dosage can be calculated.

In accordance with still another aspect of the present invention there is provided a method for teaching how to determine a calculated drug dosage using a computer having data entry means and a display, comprising the steps of:

a) entering data on the data entry means upon which a calculated drug dosage can be determined;

b) calculating the drug dosage based on the entered data;

c) entering a proposed solution to the computer; and d) indicating on the display if the proposed solution is appropriate for determining the calculated drug dosage.

In another aspect of the present invention there is provided a method of calculating drug dosage by using patient and drug parameters entered into a computer capable of displaying a visual display, the method comprising:

a) presenting a user with a visual display showing an administered dosage calculated by the computer in accordance with a formula by which the dosage is calculated from the parameters;

b) presenting the user with a visual display showing the parameters formatted in accordance with the formula.

In accordance with still another aspect of the present invention there is provided a computer having a program for working through problems by using at least one method from a calculated method group which consists essentially of a ratio (fraction format) method, a proportion (means/extremes) method, a formula method, and a dimensional analysis method;

the computer having a visual display, a data entry device, a memory storage device, and a central processing unit for coordinating the operation of the visual display, the data entry device, and the memory storage device, in accordance with the program;

the program being constructed and arranged for causing the computer to operate in at least one calculating mode from a mode group which comprises a normal mode, a pediatric mode, an IV drip mode, and a solution mode, each the mode causing the computer to determine a drug dosage which is appropriate for a particular patient.

DESCRIPTION OF THE DRAWINGS

FIGS. 2–25 illustrate various visual display screens of the device of FIG. 1 during an exemplary use.

DETAILED DESCRIPTION OF THE INVENTION

Figure 1:
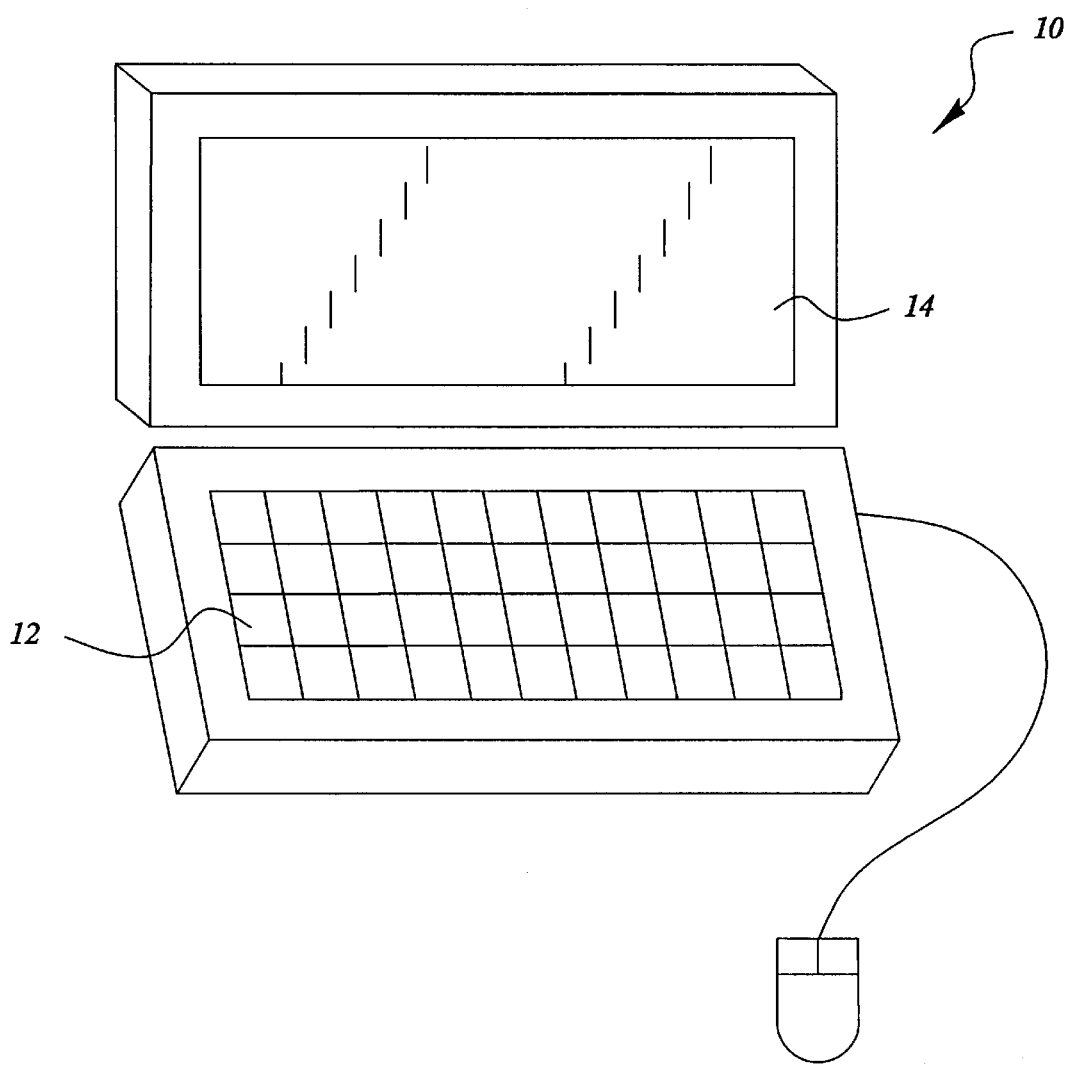
FIG. 1 is a perspective view of a device made in accordance with the present invention.

Referring to FIG. 1, there is illustrated a calculating device 10 made in accordance with the present invention. The device 10 includes a central processing unit (not shown) as is typically found in computers, for example, but not by way of limitation, a Pentium CPU. The device 10 is also provided with the appropriate amount of memory required for the operation of the device. A data entry means 12, such as a standard computer keyboard, is provided. In the embodiment illustrated, the keyboard is provided with specific keys to enter units, prefixes, frequency, and mode abbreviations. A display device 14, which may be a CRT, LCD screen, or any other type display device, is provided for displaying information provided by the CPU and/or data entry means 12. Alternatively the display device 14 can provide for on-screen data entry. For example means via a CRT or LCD having an on-screen unit display, for displaying keys which can be selected by a mouse "click" or other pointing device for allowing entry of data by the user to the CPU. Alternately the CRT may be a touch screen which may also be used to enter data to the CPU.

The CPU of device 10 is preprogrammed, as is well in the art, so that it can do various different tasks. The device 10 has been programmed so that it can operate in several different modes. For example, in one mode it can operate as a calculator for calculating drug dosages using the information provided by the data entry means. In another mode, device 10 can operate as a tutorial device to teach the user to properly calculate appropriate drug dosages, and unit conversions, using various different techniques.

Figure 2:
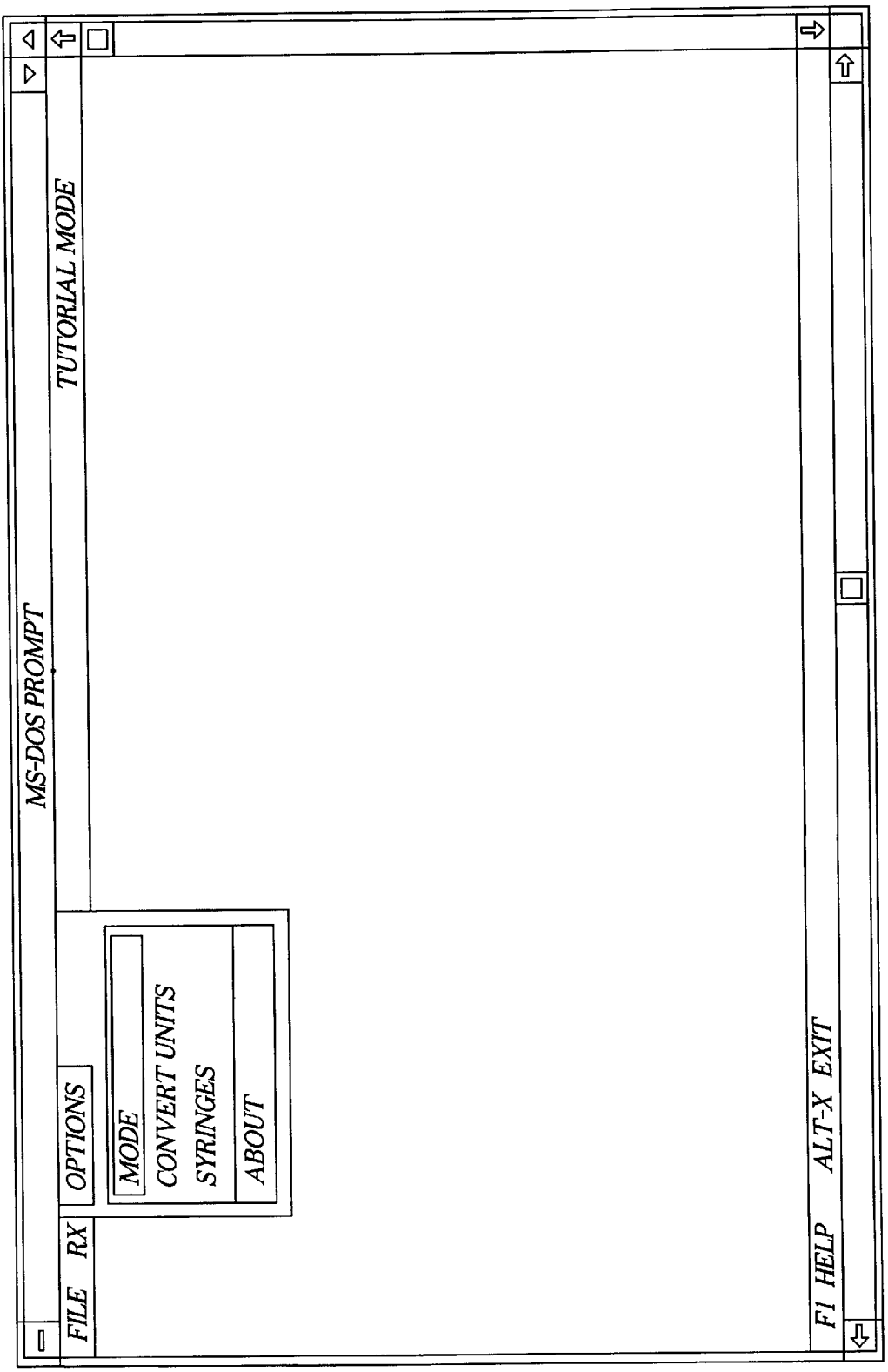

FIGS. 2–23 show various screens displayed by the CRT or LCD illustrating operation of the device 10. For example, FIG. 2 illustrates an initial screen when the device 10 is turned on. The user, in this example, could select the calculation mode, a mode for converting units, "Syringes"—a mode for practicing how to properly fill and read syringes. Another mode, not shown, here, provides help in learning how to calculate a patient's body surface area which is used as a more reliable means to calculate a drug dosage, especially in pediatrics or chemotherapy dosage calculations.

Figure 3:
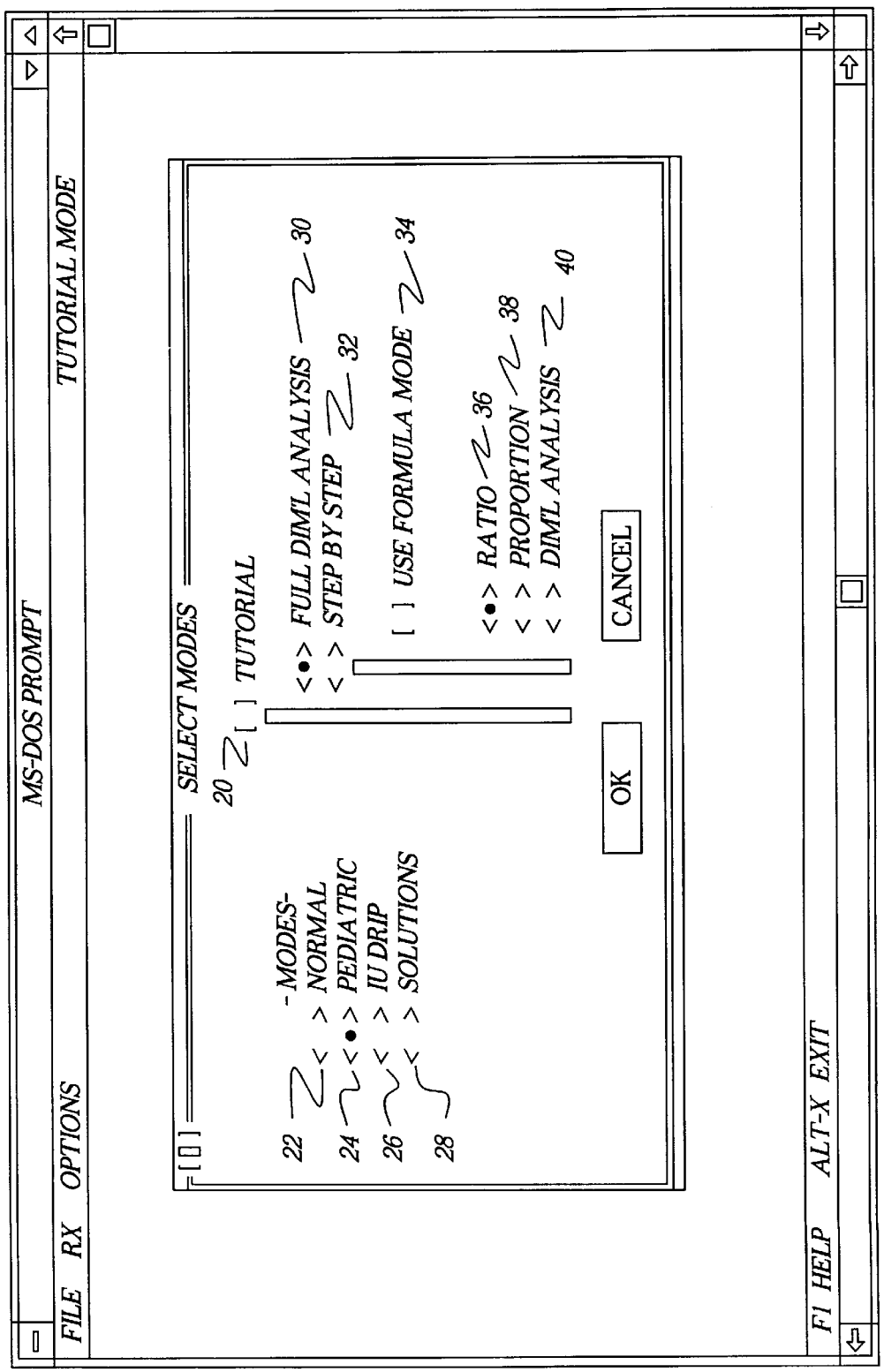

Referring to FIG. 3, there is illustrated the screen obtained when the Mode option is selected from the previous screen illustrated in FIG. 2. The user has two primary options, wherein the user can select the tutorial mode, or calculation mode without the tutorial, by entering the appropriate data on the keypad, or by "clicking" with a mouse on the selection box 20 to the left of the "Tutorial" heading.

There are four types of calculation modes shown in FIG. 3 that can be selected by selecting the appropriate selection box: Normal, Pediatric, IV drip, and solutions (selection boxes 22,24,26,28, respectively) which relate to some of the typical kinds of drug dosage calculations a health practitioner might have to perform.

Under the Tutorial selection, the user can select the technique or method to be used, either "Full Dimensional Analysis" (box 30), or the "Step-by-Step" tutorial (box 32). Under the "Step-by-Step" selection (box 32), the user can explore the following calculation methods: "Use Formula Mode" (box 34), "Ratio" (box 36), "Proportion" (box 38), or "Dim'l Analysis" (box 40).

The illustrations that follow are those in which the user has selected to do a drug dosage calculation in the non-tutorial mode (no "x" in box 20), and for a Pediatric Mode selection ("x" in box 24). In order for the user to complete a drug dosage calculation, the user must first enter the data needed in the RxEntry screen 25 illustrated in FIG. 4. The user can access screen 25 from a standard type of menu option screen not shown here. The RxEntry screen 25 is divided into three sections for data entry: the Client (Patient) section 27, the Prescriber section 29, and the Medication section 31. (Information entered in the Prescriber section 29 is not necessary for a dosage calculation, and therefore will not be discussed further.) It is to be understood that the data entry screen 25 of FIG. 4 may be set up to require any information desired and may be divided into any number of sections.

Figure 4:
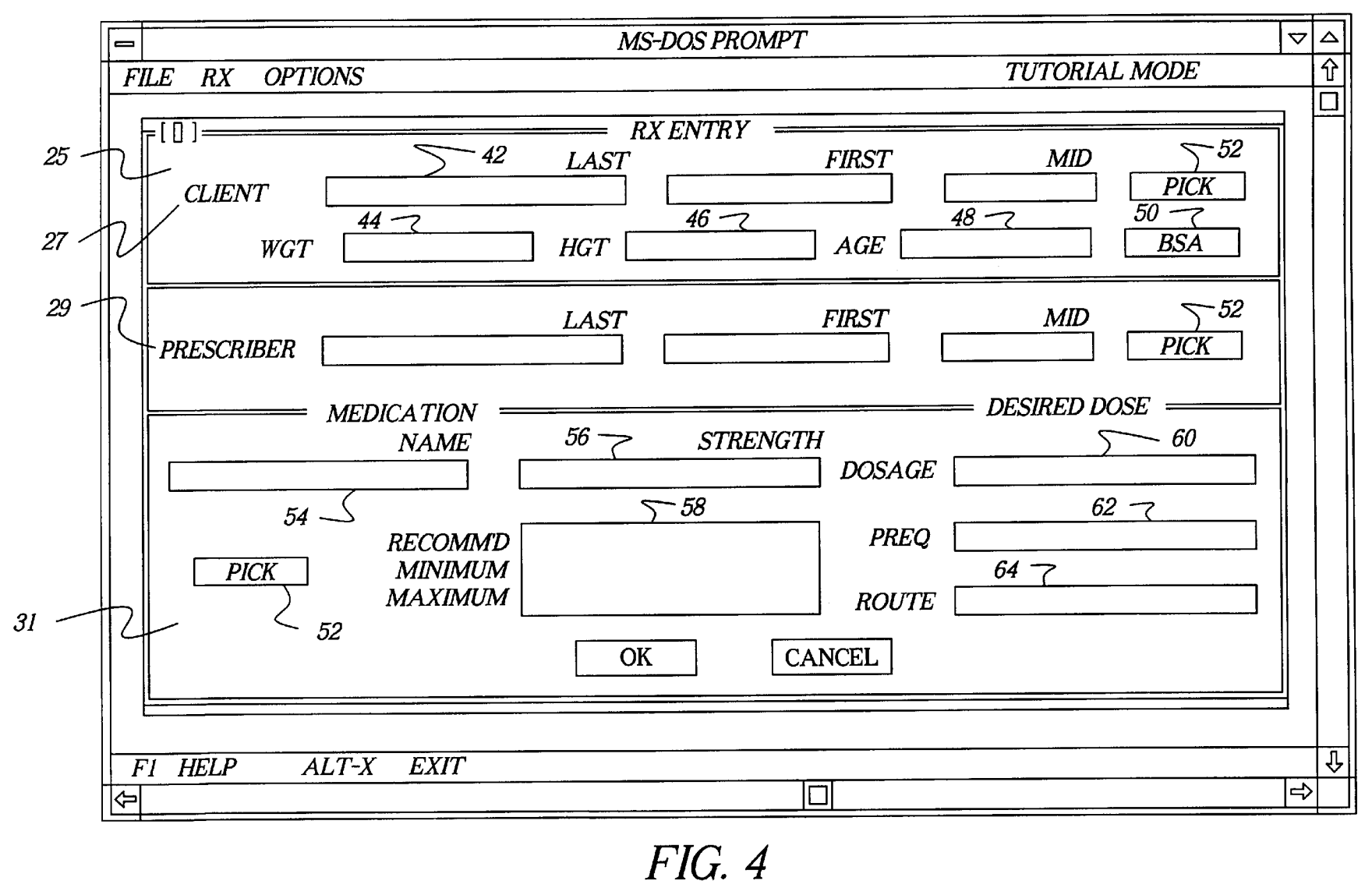
Figure 5:
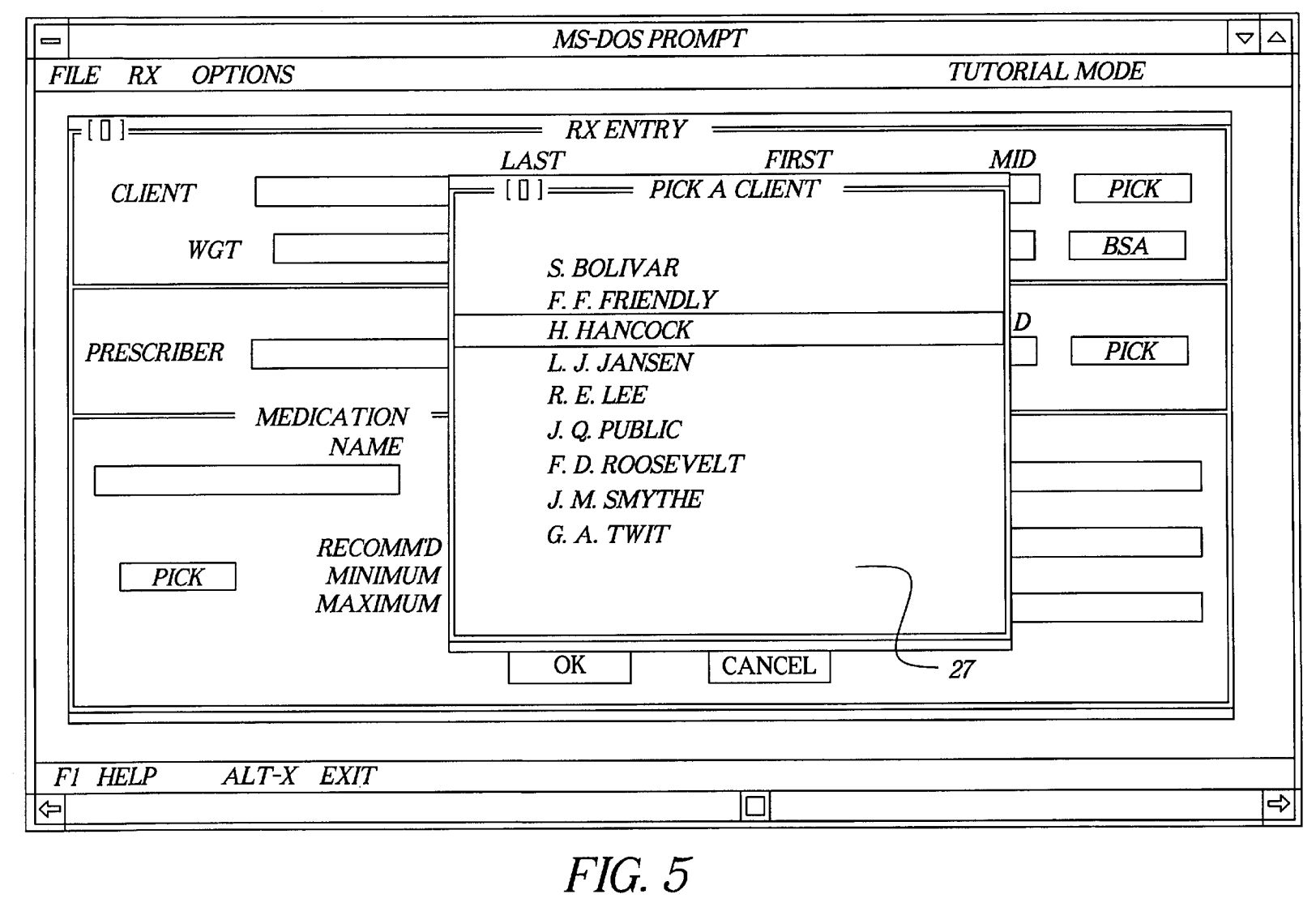

In the embodiment illustrated in FIG. 4, data can be entered about the client: name, weight (Wgt), height ((Hgt), Age, and Body Surface Area (BSA) in boxes 42,44,46,48, 50, respectively. By selecting the "pick" box 52 a (stored) a list of clients, prescriber, or medication information will be displayed in a portion of the screen, and from which a selection could be made. FIG. 5 illustrates an exemplary list when the "Pick" box in the client section 27 is selected. The result of picking "H. Hancock" from the client list is illustrated in the top section of FIG. 6.

In the Medication section 31 of the screen 25 in FIG. 4 various types of information regarding the type and available dosage strength of medication is entered, how the drug is to be administered and the desired dosage is entered. More specifically there is entered the drug name (box 54), available dosage strength (box 56), recommended (Recomm'd), Minimum, and Maximum dosages (box 58) is entered. These drugs and dosage strengths can be "picked" from a list (library) of previously stored information. For example, FIG. 6 illustrates "Pick a Drug" box 55. Selection of box 55 will provide a list of medications and the available dosage strengths that have been stored for possible selection. It should be noted that the selection of "cardizem" as a medication is shown for the purposes of illustration only. This particular medication would not be used in a pediatric application, but the display of an inappropriate selection does illustrate one way in which medication errors could be avoided using this drug dosage calculator, that is, the prescriber, or whomever is responsible for the administration of the drug could immediately see the wrong drug had been selected. A visual alert on display device 14 and/or audio alert incorporated into device 10 can be automatically activated when an incorrect or potentially dangerous selection is made by the user.

In FIG. 4, the desired dosage (Dosage), the frequency with which it is to be administered (Frequency), and the Route of administration are entered in boxes 60,62,64, respectively. An illustration of the entry of all the information is illustrated in FIG. 7.

FIG. 7 illustrates the data entry that may be needed in order to calculate the correct dosage. If the user, for example, fails to enter the required information needed for the calculation, an "Alert" or "Error" message would be displayed to assist the user to correct the error. For example: If the user failed to enter in the client's weight (Wgt) in box 44, the program would indicate that an item was missing and place the cursor in box 44 for the user to insert the weight (in this example, "38 lb"). By selecting the OK button (box 66), the calculation used to obtain the result is displayed in the middle section 35 shown in FIG. 8.

FIG. 8 provides in three sections both a summary of the information previously entered (FIG. 7) and the calculated result. The first seven lines of the top section 33 of FIG. 8 summarizes most of the information entered in the Client and Medication information sections in FIG. 7. The last line 8 L8 of FIG. 8 displays the Administered Dose which contains two types of information: 1) the calculated dose ("1 tab"), and 2) a translation of the abbreviations entered for the Frequency (qid) and Route (po): "four (4) times a day", "by mouth", respectively. The method used to calculate this dosage is displayed in the center section 35. For example, the first step involves the conversion of the client's weight in pounds (38 lb) to kilograms, since the desired dosage is specified per kilogram body weight (3.5 mg/kg). Note that in this example the result (1.005 tab) is rounded off to the nearest whole number of tablets that should be administered. The lower section 37 summarizes, in the last three lines, the maximum, minimum, and the recommended dose information entered in the screen shown in FIG. 7. The top line L10 (240 mg/day) contains the calculated daily dosage using the frequency information (qid=4 times a day). This calculated daily dosage can then be compared to the maximum dose (360 mg/day) and if the calculated dose exceeds predetermined parameters, such the maximum dose, a warning, an audio and/visual alarm would be provided. For example, if the frequency were entered as "q4h" (every 4 hours), the calculated dosage (360 mg/day=60 mg/dose×6 dose/day) would be just at the maximum; if "q2h" (every 2 hours), the calculated does (720 mg/day=60 mg/dose×12 dose/day) would exceed the maximum dose, as illustrated in FIG. 9. A alarm would then be activated by the CPU to alert the user.

Some time has been spent above on showing how medication errors can arise either from incorrect data entry, or calculation set-ups, in order to illustrate the difficulty that many health care practitioners, especially beginning nursing students, have in completing the calculations. The foregoing series of steps is followed if only the result and calculation set-up of the calculation of a drug dosage is solely desired. However, device 10 can be activated to provide a learner controlled tutorial (LCT) mode to help the user learn how to calculate the dosage by one of the "paper-and-pencil" methods. The LCT mode can be activated at any time by the user selecting the "Tutorial" mode option (selection box 20) illustrated in FIG. 3. After the data is entered as before in the screen illustrated in FIG. 7 and selecting the OK button (box 66), a new screen display is generated as illustrated in FIG. 10.

Figure 10:
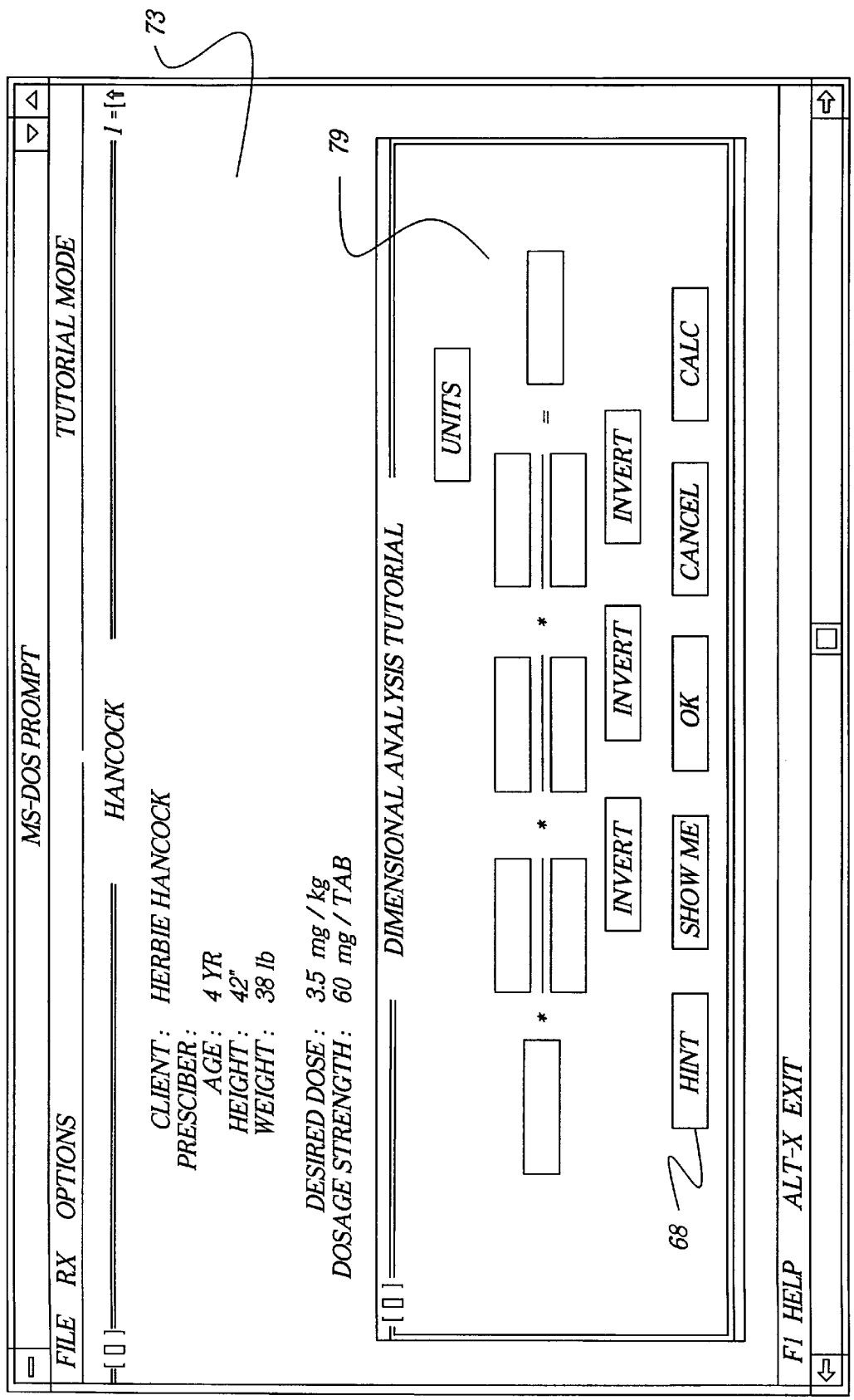

There are two information sections in FIG. 10. The top section 73 repeats most of the information found in the top section 33 of FIG. 8. The other section 79, or window, displays the "to be filled in" set-up to calculate the dosage using a method or technique usually referred to as "Dimensional Analysis". The use of the "Full" prefix will be explained later. In this method, the calculated result is obtained by multiplying a starting value by a series of conversion factors—the result of which can be checked by seeing to it that appropriate units cancel out, leaving only the desired units (in this case, "tab"). Of course, errors can arise from arithmetic mistakes. It should be emphasized that while there are many who find this method of solving a conversion very logical, a substantial number of people do not find the method obvious. By providing the "Set-Up" of the problem and the solution, set-up errors made by the user can be avoided or minimized.

The device 10 is looking for the final answer (i.e., "1 tab"). If the user is not sure how to start, the "Hint" selection button (box 68) can be activated, which provides (on 3 successive activations of the box 68) the information found in FIG. 11 (see upper left hand corner of window) needed to begin the calculation, i.e., a conversion factor (1 kg=2.205 lb), dosage strength (1 tab=60 mg), and the client weight (38 lb). Thus, the solution can be displayed in incremental steps so as to allow the user to learn at his or her own pace. With this information the user can now begin. Suppose the user entered in the conversion factor as shown in FIG. 12.

Figure 12:
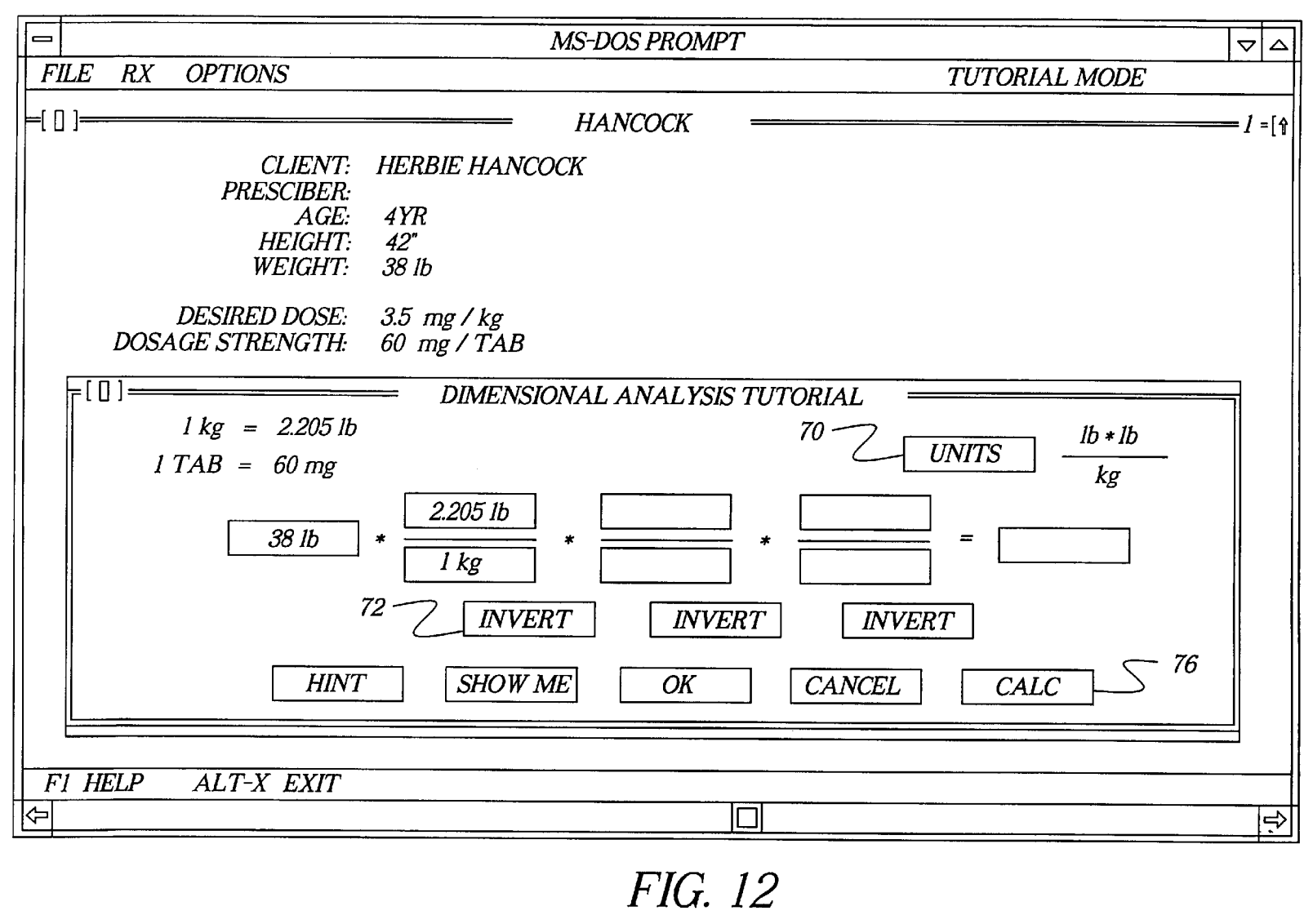

That the conversion factor has been incorrectly placed in the set-up in FIG. 12 can be checked by selecting the Units button (box 70) which displays the units (lb×lb/kg) that would be produced if this conversion were carried out. Clearly, then the conversion factor must be inverted. This is accomplished by either correcting the entries manually, or selecting the Invert button (box 72).

Figure 15:
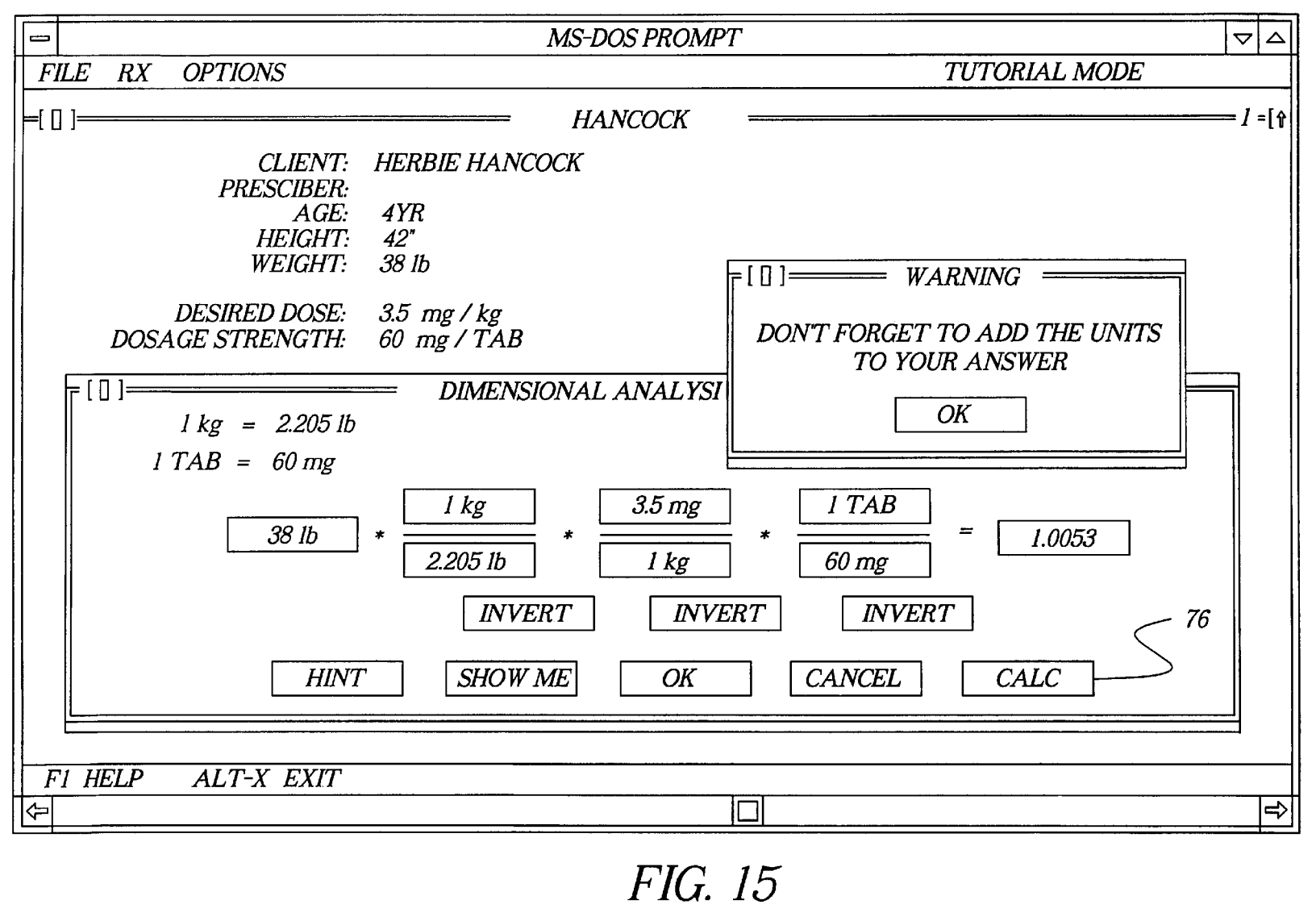

The result of this, after also checking the Units button (box 70) is illustrated in FIG. 13. In FIG. 13 is also displayed the calculated value (17.23 kg) obtained by activating the "ShowMe" button (box 74). Thus, the user could proceed through the calculation in a "step by step" fashion until they arrived at the complete "Set-Up", and entered an answer. FIG. 14 shows the correct "Set-Up". In FIG. 15 is shown the answer (1.005) the user had entered. The "Warning" window reminds the user that the answer must contain a unit (tab). Other warnings may also be provided, for example, to the accuracy of the answer or that the proposed solution is not appropriate. There are other options available in device 10 that are not discussed in any detail in this description. For example, activation of the Calc button (box 76), produces a "pop up" standard calculator that can be used to complete the arithmetic operations. (See FIG. 19 for example.)

FIGS. 10–15 illustrated the use of the Learner Controlled Tutorial (LCT) to complete a drug dosage calculation using the "full" dimensional analysis method. The "full" method is characterized by the "stringing" together conversion factors required for completing the problem without stopping to calculate the answers from each conversion step. The LCT can be modified to permit the user to select the Step-by-Step method (FIG. 3, box 32) which requires the user to obtain the answer from each conversion and use it as the starting point for the next conversion. (For example, the result, 17.23 kg in FIG. 13, obtained from the conversion calculation of a 38 lb client is the starting point for calculation the medication dosage.) The user choosing the Step-by-Step tutorial could use any one of four commonly used problem solving techniques: Ratios, Proportions, Formula, or Dimensional Analysis by selecting the appropriate box (in FIG. 3: box 36,38,34,40, respectively).

Figure 16:
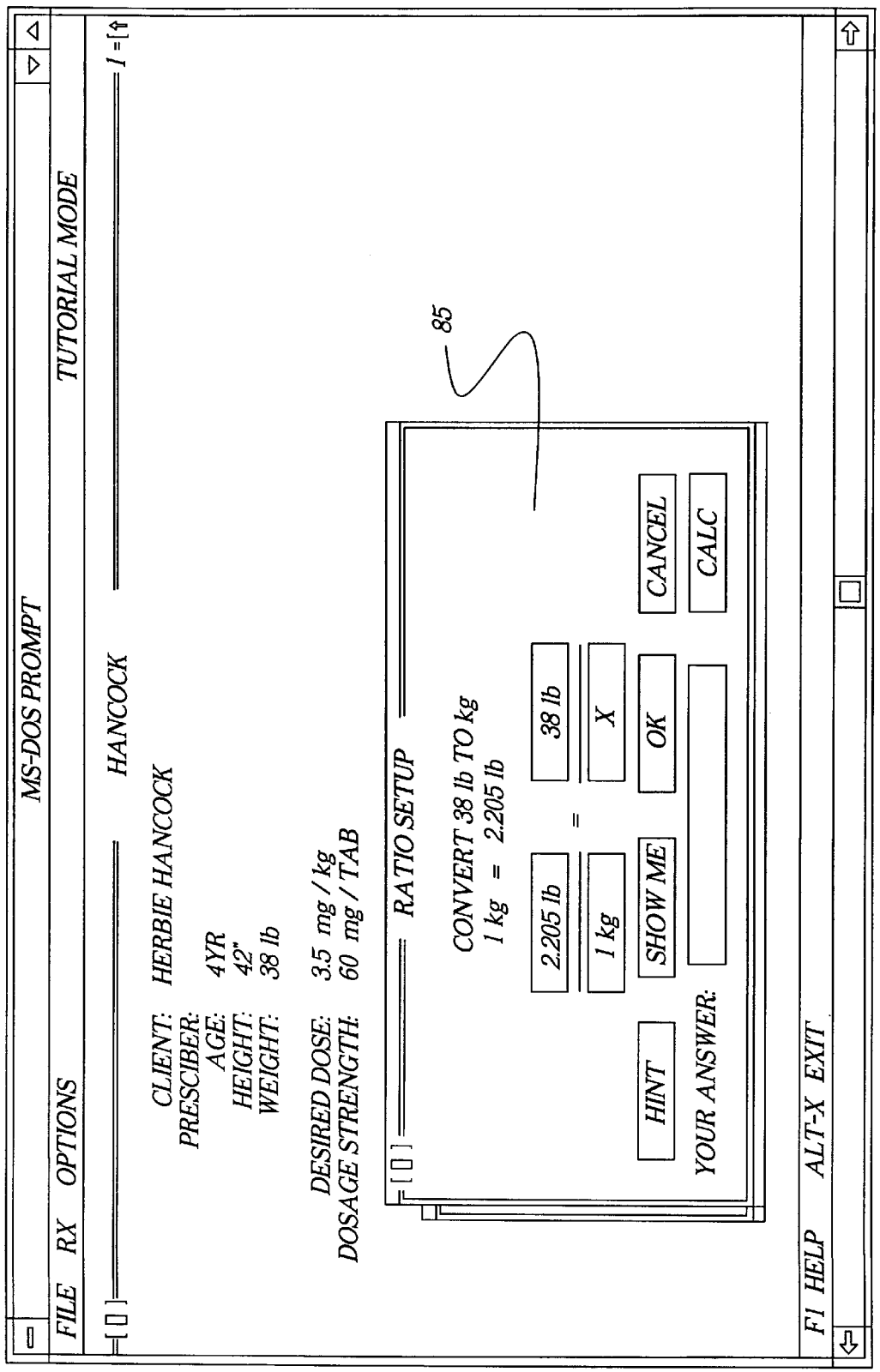

FIG. 16 illustrates the completed "Set-Up" in box 85 for the Ratio method (selecting box 32 and 36, FIG. 3) required for the first conversion ("Convert 38 lb to kg"). The first "hint" given the user is the conversion factor needed to complete the conversion ("1 kg=2.205 lb"). FIG. 16 shows how by selecting on the "Hint" or "ShowMe" button allows the user to see one way the "Set-Up" could be filled in with the correct terms. The user can, of course, fill in the blanks of the ratio set-up in a number of possible arrangements. The program will provide suggestions when there is an improper set-up. As previously discussed, the CPU can be preprogrammed to display the solution in incremental steps so as to allow the user to learn at his or her own pace.

Figure 17:
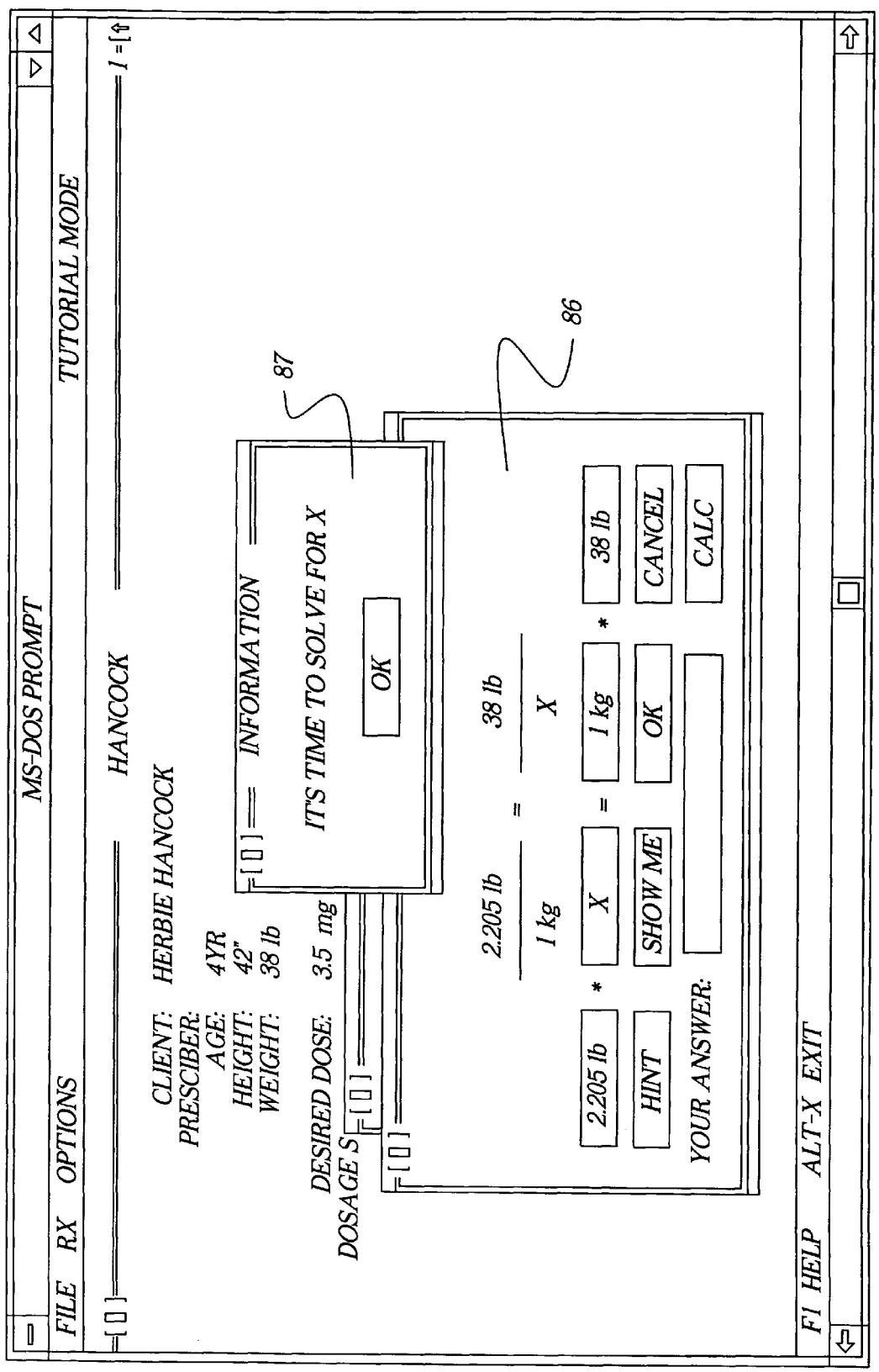
Figure 18:
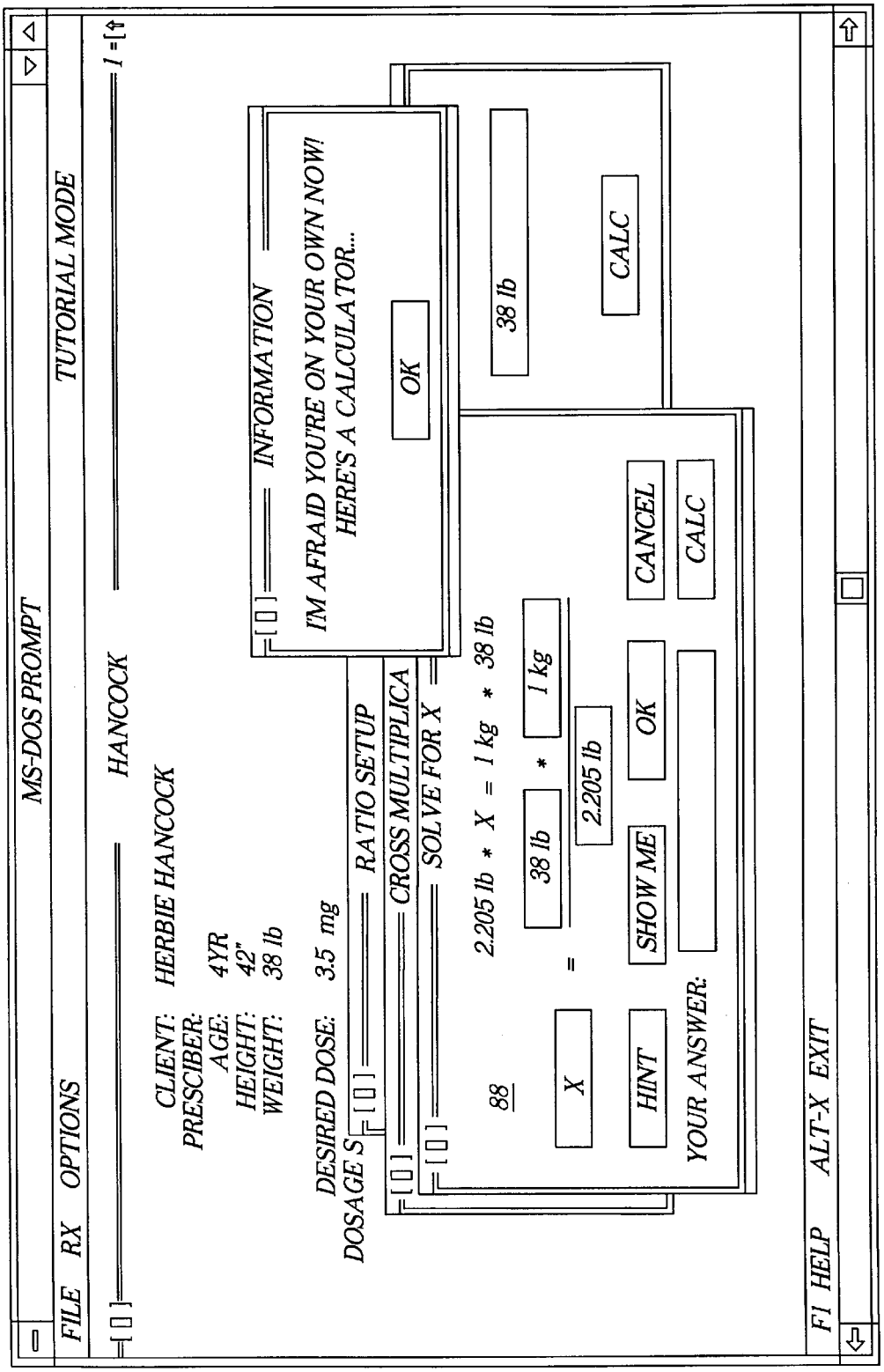
Figure 19:
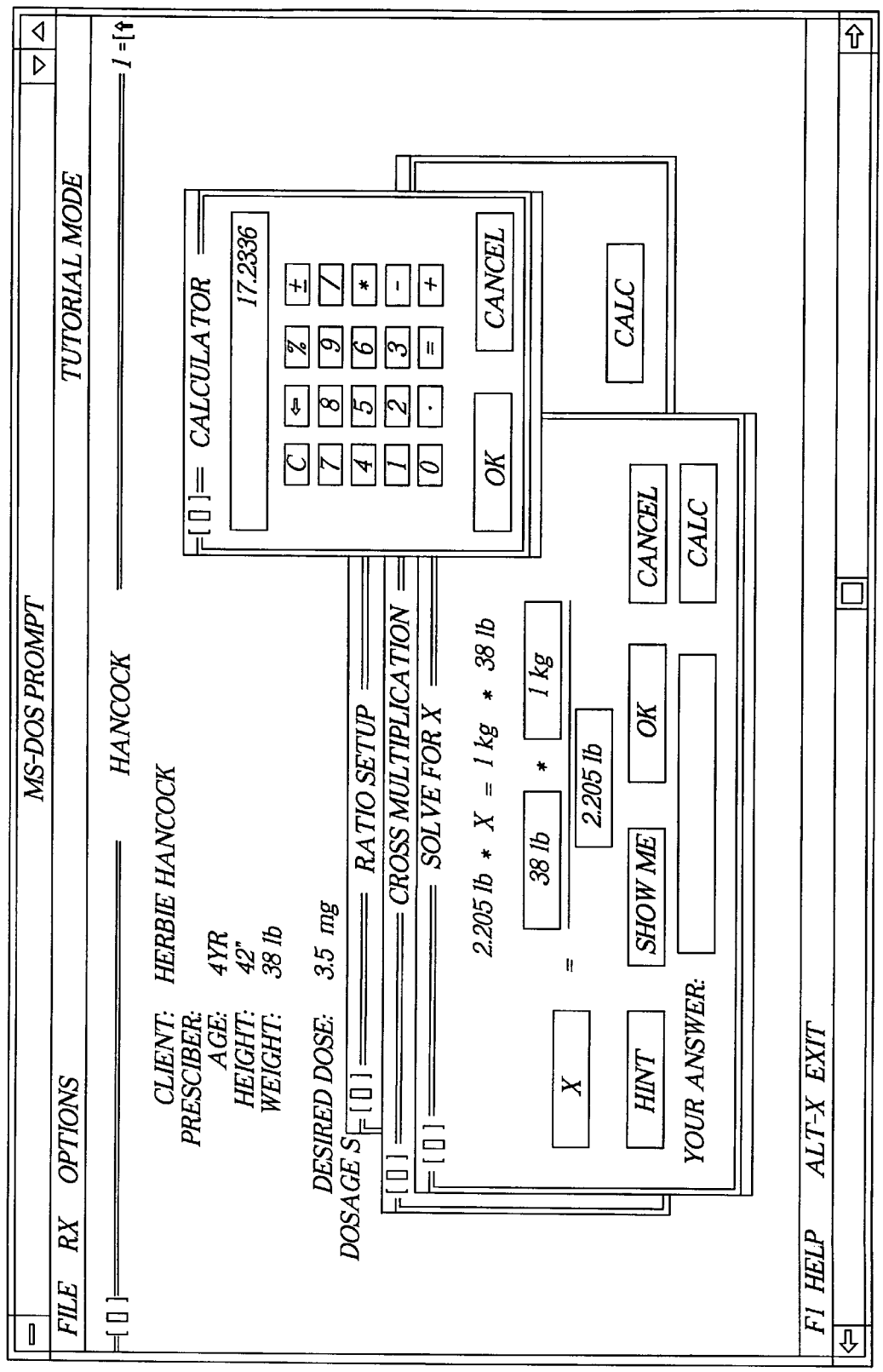

FIG. 17 illustrates the "Set-Up" for the second step of the conversion ("Cross Multiply") in box 86, and that to continue it is now time to "Solve for x" shown in box 87. FIG. 18 illustrates in box 88 the final step for the conversion ("Solving for x"). At this point no further hints are provided, though the user is provided with the option to use a pop-up calculator—shown in FIG. 19.

Once the user has obtained the answer (17.2 kg) for the conversion, the user is now ready to set up the ratio for the second conversion, given the desired dosage: "Dosage=3.5 mg/kg". FIG. 20 illustrates in box 89 a "filled in" ratio set up. The user then continues working through the various steps as before (FIGS. 16–19) to complete the conversion. This procedure is continued until the final dosage is determined.

Figure 21:
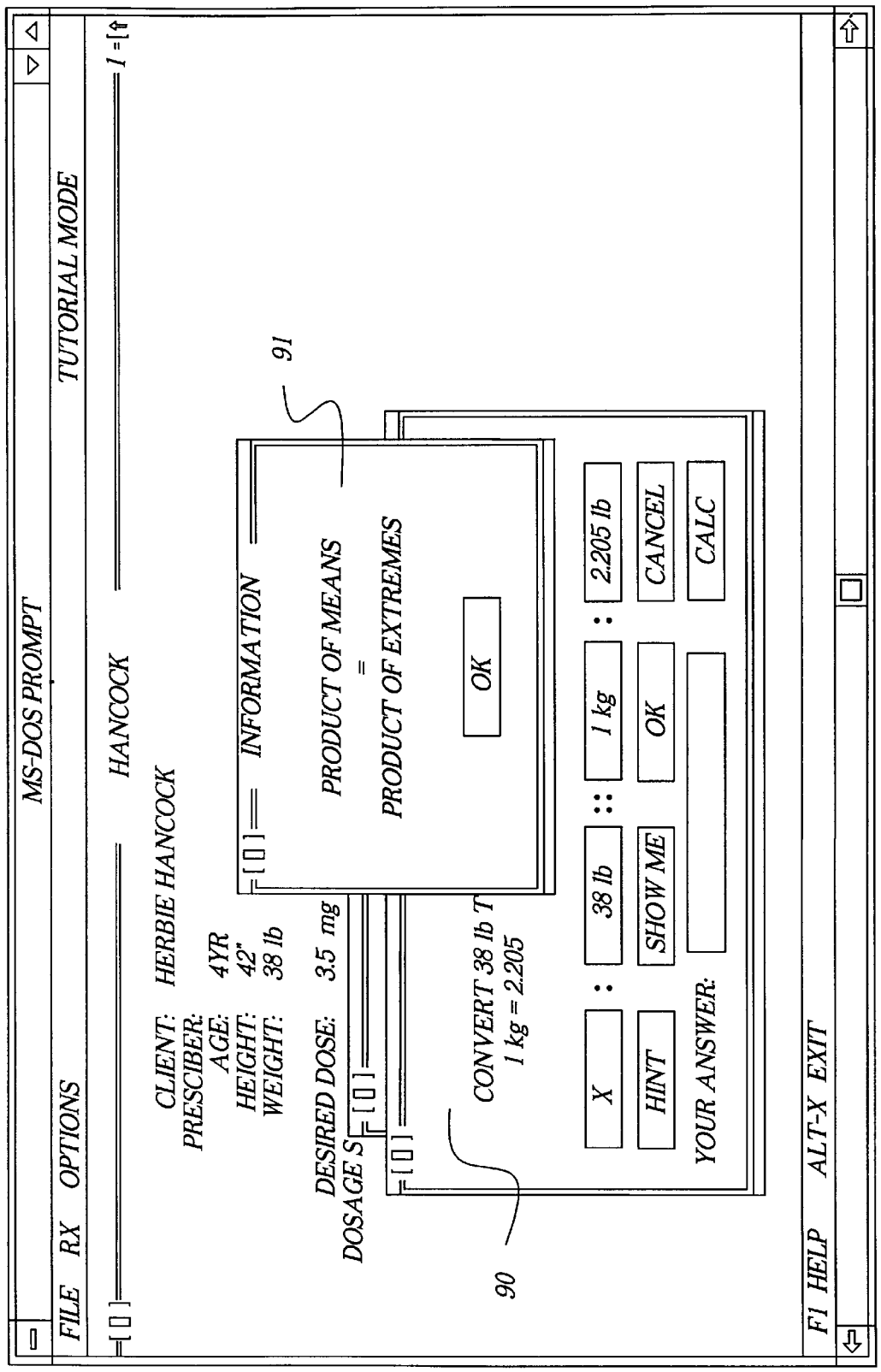

FIG. 21 in box 90 illustrates the first step of the set-up if the user had selected to solve the problem using the Proportion method (FIG. 3, box 38). In a proportion, the terms in each proportion are separated by a colon (:); and each proportion separated from each other by two colons (::). The next two steps are almost identical to those generated by the ratio method (FIGS. 17 and 18), though the set-up for the second step is generated by applying the operation: "The product of the means (the inner terms on either side of the two colons) equals the product of the extremes (the outer terms)", shown in box 91.

Figure 22:
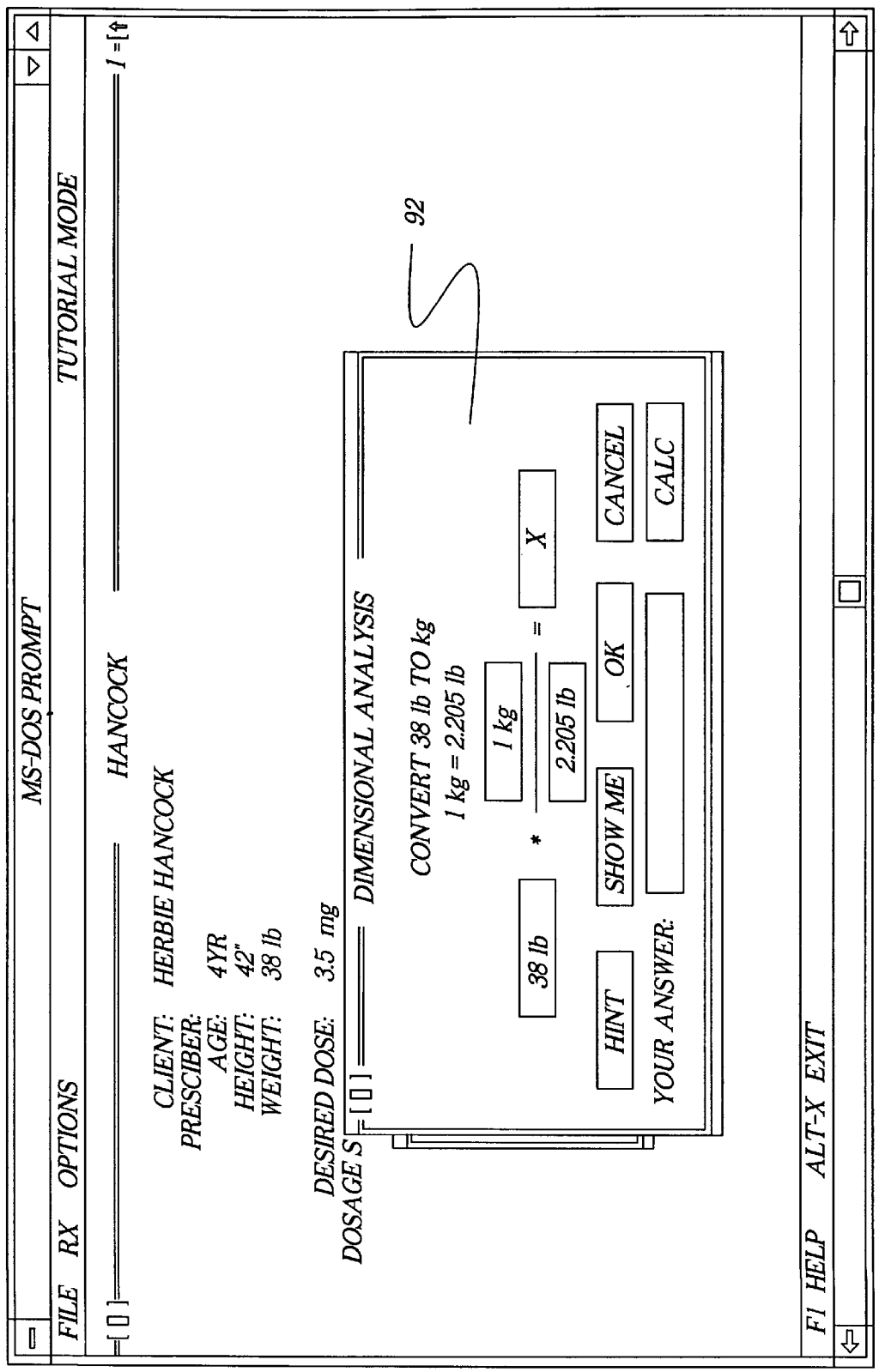

FIG. 22 in box 92 illustrates the filled in set-up for the first conversion if the user selects the dimensional analysis method tutorial (FIG. 3, box 40). In effect, the selection of this option, means that the user will avoid using the first two steps required by the ratio or proportion method, since you begin with "Solving for x". (Compare the set-up in FIG. 11 to that of FIG. 18.)

FIG. 23 shows in box 93 the set-up for the final conversion if the user selects to use the formula method tutorial (FIG. 3, box 34). If the formula substitutions are made for D (the desired dose=60.34 mg for a client weighing 17.23 kg), H (the dose on hand=60 mg), and Q (the dose unit=tab). When the user has placed the correct answer in box 78, FIG. 23, and then clicked on the OK button in the "Information" window, the user is returned to the summary screen previously illustrated in FIG. 8. The display of the calculation set-up every time a calculation is completed serves to reinforce in the user a familiarity with the method used to arrive at the answer.

Thus, when the ratio, proportion, formula, dimensional analysis tutorial method is selected, the user can learn to solve drug dosage calculations using the technique or method most familiar to the user and at a pace where the answer can be arrived at by either a Step-by-Step or condensed technique. The user is also provided with hints as the user needs them to help the user complete the problem wet-up satisfactorily.

The LCT has been described with respect to drug dosage calculations, which for the most part involved various types of conversions. This same technique can be applied to other types of conversions. Thus, when the "Convert Units" option is selected, as shown in FIG. 2, a screen will be displayed to permit the user to carry out conversions using the same tutorial options illustrated above.

Figure 24:
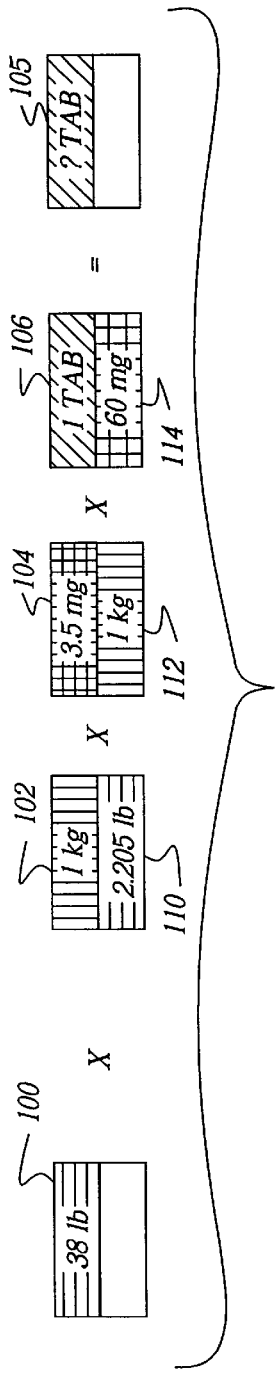

It is to be understood that various hints, warnings, and types of information help is provided by device 10 to assist the user in arriving at the correct solution. FIG. 24 illustrates another type of hint that can be used to assist in keeping track of common units. In this embodiment (of the full dimensional analysis set-up illustrated in FIG. 14), each unit is associated with a "tile" placed in either the numerator (box 100,102,104,106,108) or denominator (box 110,112,114). The tiles having the same unit are given a common design, color, or some other indicia. In a preferred embodiment, color would be used, but other indicia such as cross-hatching, used in these figures, may be used. Identical units are given the same indicia. For example, the identical units in box 100 and 110 (lb), box 102 and 112 (kg), box 104 and 114 (mg) might be assigned the colors red, blue, green (see FIG. 28). The "tab" unit might have another color, such as yellow. The user can then see when the same units are canceled when they appear in both the numerator and denominator. The color or indicia would disappear when the units are canceled, or removed, leaving at the end of all cancellations only the color of the unit of the answer.

Figure 25:
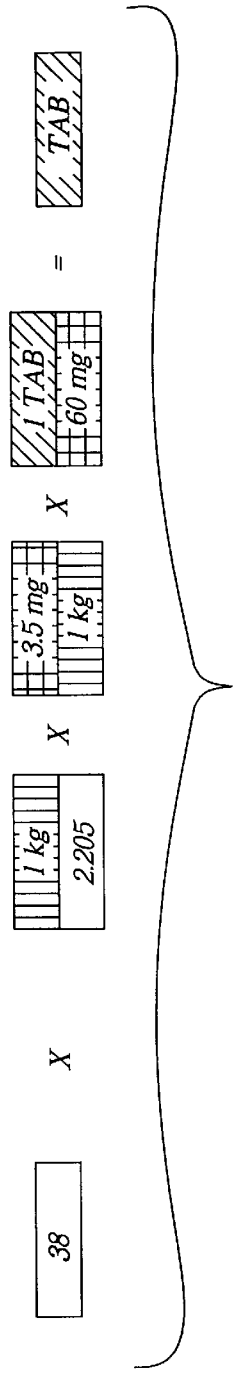
Figure 26:
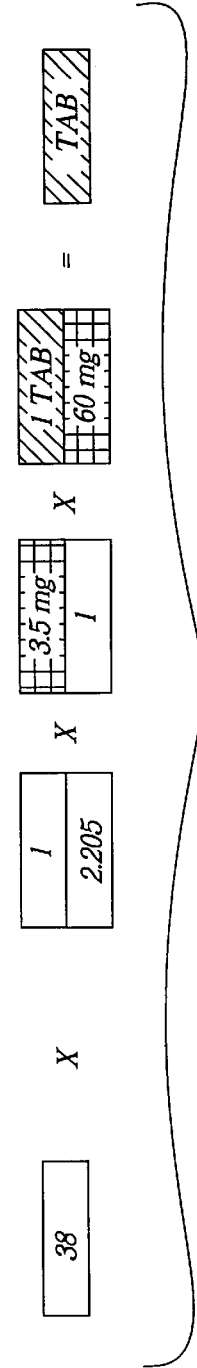

FIGS. 25, 26, and 27 illustrate the stepwise cancellation of the "lb", "kg", and "mg" units. On completion of the arithmetic, the numerical value (1.005) is obtained with the proper unit attached.

It is, of course, to be understood that various other changes can be made without departing from the scope of the present invention. The present invention being defined by the following claims.

Parts List

10 . . . calculating device
12 . . . entry means
14 . . . display device
20,22,24,26,28,30,32,34,36,38,40 . . . selection box
25 . . . RxEntry screen
27 . . . Client section
29 . . . Prescriber section
31 . . . Medication section
33,73 . . . top section
35 . . . middle section
37 . . . lower section
42,44,46,48,50 . . . boxes
52,54,56,58 . . . pick boxes
55,60,62,64,66,68,70,72,74,76,78,85,86,87,88,89, 90,91,92, 93 . . . boxes 79 ... window
100,102,104,106,108 ... numerator boxes
110,112,114 ... denominator boxes

We claim:

1. A tutorial device for teaching how to determine a calculated drug dosage, comprising:
    data entry means for entering data upon which said calculated drug dosage can be calculated;
    means for determining a calculated drug dosage;
    means for entering a proposed solution by at least one method; and
    means for indicating if said proposed solution is appropriate for determining said calculated drug dosage and providing a hint if the proposed solution is incorrect for assisting the user in determining the correct dosage, said hint being something other than displaying the correct solution or next step.

2. A tutorial device according to claim 1 wherein said means for indicating if said proposed solution is appropriate comprises means for displaying at least a portion of a solution that can be used for calculating said calculated drug dosage.

3. A tutorial device according to claim 2 wherein said means for displaying at least a portion of said solution that can be used for calculating said calculated drug dosage is displayed in incremental steps.

4. A tutorial device according to claim 1 further comprising means for converting the units of said proposed solution.

5. A tutorial device according to claim 1 wherein said means for indicating if said proposed solution is appropriate comprises a plurality of different techniques for calculating the calculated drug dosage.

6. A tutorial device according to claim 5 wherein said plurality of different techniques is selected from the following:
    ratio method
    formula method
    factor-label (dimensional analysis) method
    proportion method.

7. A tutorial device according to claim 1 wherein said hint comprises providing tiles for identifying units, said tiles having the same units being identified by the same indicia.

8. A tutorial device according to claim 7 wherein said indicia comprises color.

9. A tutorial device according to claim 7 wherein said indicia comprises shading.

10. A device for determining an appropriate drug dosage and/or tutorial for teaching how to determine a calculated drug dosage, comprising:
    a) means for placing said device in a first mode for determining an appropriate drug dosage and a second mode for placing the device in a tutorial mode;
    b) data entry means for entering data;
    c) means for determining a calculated drug dosage in response to said entered data; and
    d) display means for displaying the calculated drug dosage and for displaying the technique used for calculating the appropriate dosage and providing a hint if the proposed solution is incorrect for assisting the user in determining the correct dosage, said hint being something other than displaying the correct solution or next step.

11. A device according to claim 10 further comprising an alarm for indicating when said calculated drug dosage is not within a predetermined parameter.

12. A device according to claim 11 wherein said alarm comprises displaying a warning on said display means.

13. A device according to claim 10 further comprising a library containing a plurality of drugs and recommended dosage for said plurality of drugs.

14. A device according to claim 10 further comprising means for converting the units of said entered data so that said calculated drug dosage can be determined.

15. A device according to claim 10 wherein said hint comprises providing tiles for identifying units, said tiles having the same units being identified by the same indicia.

16. A tutorial device according to claim 15 wherein said indicia comprises color.

17. A tutorial device according to claim 16 wherein said indicia comprises shading.

18. A method for teaching how to determine a calculated drug dosage using a computer having data entry means and a display, comprising the steps of:
    a) entering data on said data entry means upon which a calculated drug dosage can be determined;
    b) calculating said drug dosage based on said entered data;
    c) entering a proposed solution to said computer; and
    d) indicating on said display if said proposed solution is appropriate for determining said calculated drug dosage and providing a hint if the proposed solution is incorrect for assisting the user in determining the correct dosage, said hint being something other than displaying the correct solution or next step.

19. A method according to claim 18 wherein the method used to determine the calculated drug dosage is displayed in incremental steps.

20. A method according to claim 18 wherein said hint comprises providing tiles for identifying units, said tiles having the same units being identified by the same indicia.

21. A tutorial device according to claim 20 wherein said indicia comprises color.

22. A tutorial device according to claim 20 wherein said indicia comprises shading.

* * * * *